US006483203B1

(12) United States Patent
McCormack

(10) Patent No.: US 6,483,203 B1
(45) Date of Patent: Nov. 19, 2002

(54) SINGLE UNIT INTEGRATED TRANSFORMER ASSEMBLY

(75) Inventor: Michael S. McCormack, Gloucester, MA (US)

(73) Assignee: 3Com Corporation, Santa Clara, CA (US)

(*) Notice: Subject to any disclaimer, the term of this patent is extended or adjusted under 35 U.S.C. 154(b) by 24 days.

(21) Appl. No.: 09/590,565

(22) Filed: Jun. 8, 2000

(51) Int. Cl.[7] .................................................. H02J 3/00
(52) U.S. Cl. .......................................... 307/17; 307/83
(58) Field of Search ...................... 307/17, 83; 395/281

(56) References Cited

U.S. PATENT DOCUMENTS

| | | | | | |
|---|---|---|---|---|---|
| 5,611,053 | A | * | 3/1997 | Wu et al. | 395/280 |
| 5,682,483 | A | * | 10/1997 | Wu et al. | 395/281 |
| 5,770,996 | A | * | 6/1998 | Severson et al. | 340/310.08 |
| 6,058,432 | A | * | 5/2000 | Shin et al. | 709/249 |
| 6,062,908 | A | * | 5/2000 | Jones | 439/620 |

* cited by examiner

*Primary Examiner*—Stephen W. Jackson
*Assistant Examiner*—Sharon Polk

(74) *Attorney, Agent, or Firm*—McGlew & Tuttle, P.C.

(57) ABSTRACT

A transformer unit includes a first isolation transformer, a second isolation transformer and a power transformer. A single package incorporates the first isolation transformer, the second isolation transformer and the power transformer. A plurality of connection pins provide connections to the first isolation transformer, to the second isolation transformer and to the power transformer. A process is also provided for connecting transmission lines to a network device including providing transmission lines carrying an electrical supply current, sufficient to power the network device, concurrently with a network data signal. The single unit has the first integrated isolation transformer the second integrated isolation transformer and the power transformer. Some of the transmission lines are connected to the first isolation transformer to isolate transmission signals on the sending transmission lines from a transmitter of the network device. Some other transmission lines are connected to the second isolation transformer to isolate transmission signals on the receiving transmission lines from a receiver of the device. Within the single unit each of the first isolation transformer and the second isolation transformer are connected to the power transformer. The power transformer is used to supply power to the circuit board of the network devise at a potential which is reduced compared to a potential of said transmission lines carrying the electrical supply current.

14 Claims, 3 Drawing Sheets

SINGLE UNIT INTEGRATED TRANSFORMER ASSEMBLY

FIELD OF THE INVENTION

The invention relates generally to the field of transformers and more particularly to transformer applications requiring multiple transformer functions.

BACKGROUND OF THE INVENTION

Transformers are used extensively for various different purposes. A well-known transformer use is to change voltage levels between a voltage supplied and a voltage to be used by an electronic device. Such a transformer is typically a core with a winding. Transformers for power applications of course vary and include transformers for high voltage applications and transformers for relatively low voltage applications.

Transformers are also used extensively for signal applications. Communications applications often use signal transformers. Such a signal transformer is used at low voltage levels for isolating a transceiver from the communications medium. This will be for example an Ethernet isolation transformer used to separate the transmitter and receiver of an Ethernet card or similar device (e.g., network interface card for NIC).

Ethernet isolation transformers are typically provided as a small package mounted on the Ethernet printed circuit board. The transformer has its connections appropriately connected to contacts on the board. The Ethernet isolation transformers (e.g., for IEEE 802.3 applications) are typically provided with very small windings and a very small ferrite core. The structure is provided with a plastic package and digital interface pins (e.g., 16 pins). The entire structure may be, for example, ¼ in. to ½ inch.

The IEEE 802.3 standard (ETHERNET) has no current provisions for supplying power to Ethernet devices. One proposal for supplying power is to provide the power on the Ethernet connection, namely the transmission medium. The issues as to supplying power involve issues as to the environment of the system as well as in the overall costs.

Providing power locally presents problems for Ethernet applications. One example of a problem encountered is the security camera problem wherein the local supply of power can be problematic as to the secure status of such a security camera. A possible solution is to provide the transmission medium as a medium for supplying power (the Ethernet wire is used for supplying power). However, this involves some problems as well.

Another network device which has been increasingly used in network environments is a network phone. Such a phone device converts audio analog signals into digital signals and sends the digital signals out in the form of packets over a network such as a local area network ( LAN). The phone devices can be provided with a power circuit which is integrated into the phone. The AC power is applied to the phone and the power is conditioned (e.g., rectified) and possibly also converted by a transformer.

A changeover from the approach of supplying power locally to a system involving supplying power via the network wires involves various problems including the need to condition the power supplied over the wire. One significant problem is the need to supply the power over the network wires at a relatively high voltage level. For example, the use of 45 volts AC or greater voltage over the wire is considered to be advantageous. However, the use of high voltage levels results in higher cost with regard to semiconductor devices used in the network device. Typically, voltage levels below 30 volts are desirable with regard to maintaining semiconductor unit costs at a low level. Semiconductor devices which use higher voltage levels typically result in higher costs.

SUMMARY AND OBJECTS OF THE INVENTION

It is an object of the invention to provide a transformer unit with a single package having an integrated signal transformer and power transformer.

It is another object of the invention to provide a transformer unit with a single package which can be mounted on a circuit board of a network device and which can connect to network wires which wires carry a signal with a power component and a communications signal component and which transformer unit transforms the signal to provide a power signal at a lower voltage value and which transformer unit isolates the network transceiver of the circuit board from the signal carried by the wires.

It is a further object of the invention to provide a unit with input connections which are connected to a transmission media and output connections which are to be connected to a communications printed circuit board (PCB) and which cooperates with the PCB to form a network device and which unit includes a signal transformer and a power transformer and the transmission media carries both a power signal to power the network device and carries communications signals to and from the network device.

According to invention, a transformer unit is provided including and isolation transformer and a power transformer. The isolation transformer and the power transformer are provided as part of a single package or within a single housing having a plurality of connection pins. The connection pins include Ethernet wire connection pins connecting to e.g. 45 volts AC wires. The wires may be the typical Ethernet $Tx^+$, $Tx^-$, $Rx^+$, $Rx^-$ lines. However, the transformer unit is preferably used wherein the wires carry a 60 Hz 48 V AC signal (60 Hz ISO 48 V poential) between the $Tx^+$ and $Tx^-$ and the $Rx^+$ and $Rx^-$. In addition, the $Tx^+$ and $Tx^-$have a series superimposed plus 2V pulse. The $Rx^+$ and $Rx^-$ have a series superimposed plus 2V pulse. Additionally, the connection pins of the transformer unit include transformer output pins providing 12 volts AC to the circuit board of the network device. Additional output pins are provided including $Tx^+$, $Tx^-$, $Rx^+$ and $Rx^-$, which signals are isolated by the isolation transformer portion of the transformer unit.

The unit preferably includes a power transformer portion including a core and a winding with two isolation transformers each including a core and windings. The isolation transformers each include a center tap, which may be used to eliminate noise (electromagnetic interference).

It is still another object of the invention to provide a process for connecting transmission lines carrying a power signal component and a transmission signal component to a network device which uses the power supplied by the network transmission lines.

According to a further aspect of the invention, a process is provided for connecting a network device, including providing a single unit with integrated isolation transformers and power transformer. The unit is connected to 4 transmission lines carrying a network signal and power signal (a signal with a power component and with a network communications signal component). A first isolation transformer in the unit isolates transmission signals on the sending transmission lines from a transmitter of the device. A second isolation transformer in the unit isolates transmission signals on the receiving transmission lines from a receiver of the device. Each of the first isolation transformer and second isolation transformer are connected to the power transformer, which supplies power to the circuit board of the device.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
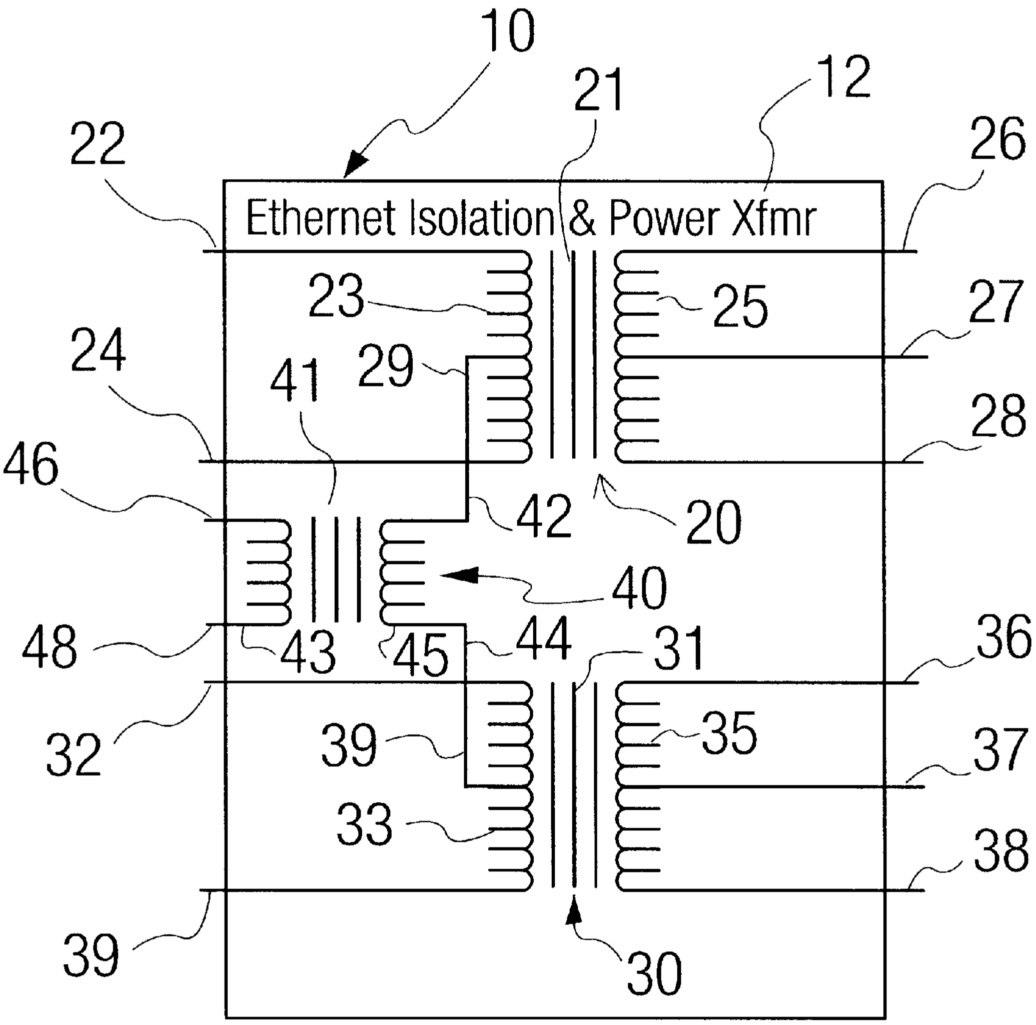
FIG. 1 is a diagram of the transformer unit with integrated isolation transformer and power transformer according to the invention.

Referring to the drawings in particular, the invention comprises a single unit integrated transformer assembly generally designated 10 as shown in FIG. 1. The unit 10 includes a first isolation transformer 20, a second isolation transformer 30 and power transformer 40 provided integrated within a single package 12.

The first isolation transformer 20 includes a ferrite core 21 and windings 23 and 25. Transformer 20 has a first input connection 22 and second input connection 24. The first input connection 22 and second input connection 24 are provided at ends of the winding 23. First isolation transformer 20 has a first output connection 26 and second output connection 28 at ends of coil 25 as well as a center tap 27 connected at the center of the coil 25. A center tap 29 is connected to the first coil 23.

The second isolation transformer 30 includes a ferrite core 31 and windings 33 and 35. Transformer 30 has a first input connection 32 and second input connection 34. The first input connection 32 and the second input connection 34 are provided an ends of the winding 33. Transformer 30 has a first output connection 36 and second output connection 38 connected to ends of coil 35 as well as a center tap 37 connected at the center of the coil 35. A center tap 39 is connected to the first coil 33.

The power transformer 40 includes a core 41 with windings 43 and 45. Winding 45 is connected at 42 to the center tap 29 of the first isolation transformer 20. Winding 45 is connected at 44 to the center tap 39 of the second isolation transformer 30. Coil 43 provides two output connections 46 and 48.

Figure 2:
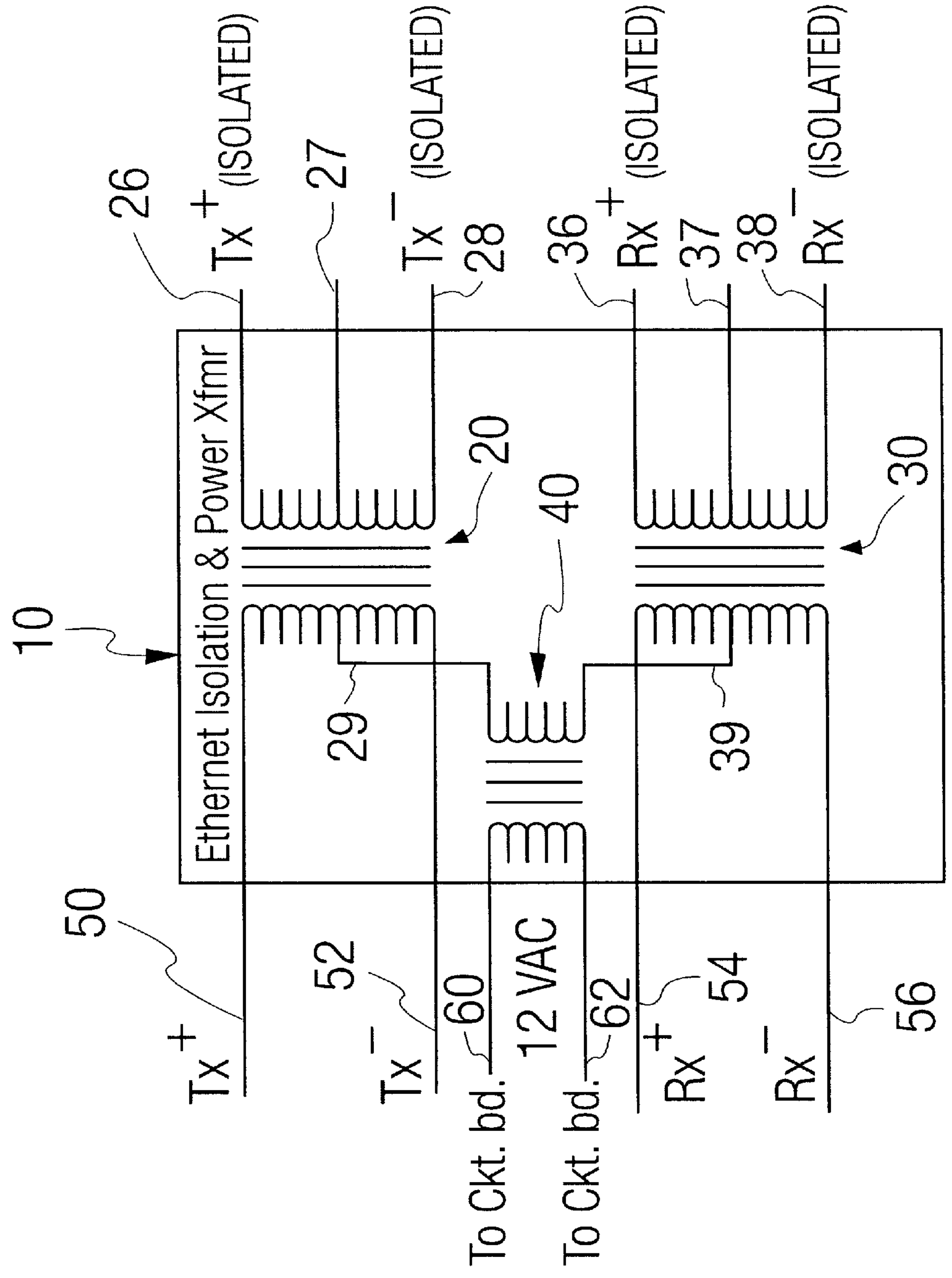
FIG. 2 is a diagram similar to FIG. 1 showing connections and the environment of use of the unit FIG. 1.

As shown in FIG. 2, the single unit integrated transformer assembly 10 is advantageously used with a network connection providing the network communications signal as well as the power signal. That is, a signal is provided over the network lines 50,52,54 and 56 which includes both a power component as well as the signal component. The line 50 is the transmission plus line or $Tx^+$ line, the line 52 is the transmission minus line or $Tx^-$ line, the line 54 is receiving plus line or $Rx^+$line and the line 56 is the receiving minus line or $Rx^-$ line. Looking at lines 50 and 52, the lines have a 60 Hz AC signal with a 48 volt potential. Series superimposed on this, on the $Tx^+$ line and $Tx^-$ line, is a 2V pulse signal. Looking at lines 54 and 56, the lines have a 60 Hz AC signal with 48 volt potential. Series superimposed on this, on the $Tx^+$ line and $Tx^-$ line, is a 2V pulse signal. The first isolation transformer 20 provides an isolated signal at output connections 26 and 28 as well as a center tap signal at 27, used to eliminate noise (EMI). The second isolation transformer 30 provides an isolated signal at the output connections 36 and 38 as well as a center tap signal at 37, used to eliminate noise (EMI).

The power transformer 40 is provided with a signal from the Tx lines and the Rx lines at 29 and 39 respectively. The transformer 40 transforms the 48 volt AC signal to a 12 volt AC signal, which is sent to the circuit board at 60 and 62.

Figure 3:
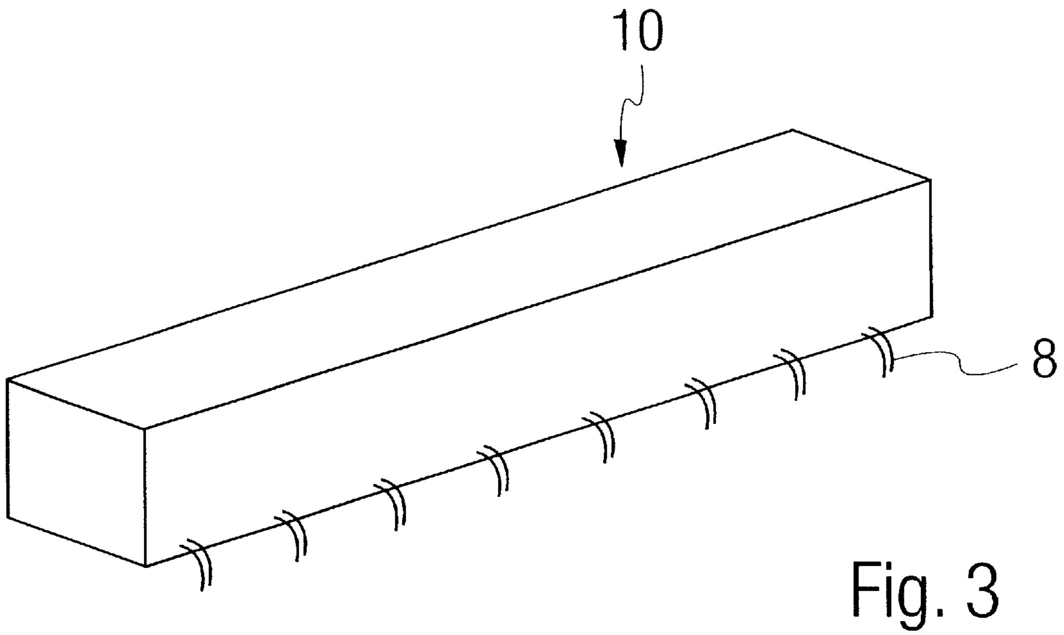
FIG. 3 is a perspective view of the unit according to the invention.

FIG. 3 shows the preferred form of the integrated transformer assembly unit 10. The assembly 10 has a plastic casing or housing and a plurality of pins 8 which include pins corresponding to the connections 22, 24, 36,27, 28, 32, 34, 36, 37, 38, 46 and 48.

The process of the invention includes providing the single unit 10 with integrated first isolation transformer 20, second isolation transformer 30 and power transformer 40 provided as THE integrated transformer assembly unit 10. First and second Ethernet transmission lines 50 and 52 are provided which carry a signal including a 60 Hz ISO 48V potential component and a series superimposed communication pulse (e.g.+/−2V) component. Similarly, first and second Ethernet receiving lines 54 and 56 are provided which carry a signal including a 60 Hz ISO 48V potential component and a series superimposed coumiunication pulse (e.g.+/−2V) component. Line 50 is connected to contact 22, line 52 is connected to contact 24, line 54 is connected to contact 32 and line 56 is connected to contact 34. The contacts 22, 24, 32 and 34 are provided as pins 8 shown in FIG. 3. The pins 8 are connected by the printed circuit board to the lines 50, 52, 54 and 56. The unit 10 has further pins 8 including output contacts, namely contacts 26, 27, 28, 36, 37 and 38. Contacts 26 and 28 are connected, such as via an appropriate filter, to a transmitter formed on the printed circuit board of the network device. Contacts 36 and 38 are connected, such as via an appropriate filter, to a receiver formed on the print circuit board of the network device. Center taps 29 and 39 at the network wire side of each of the isolation transformers are connected to the power transformer 40. The power transformer 40 has output connections 46 and 48 connected to circuit board connections 60 and 62. With this arrangement, 12 volt AC power is provided via the power transformer 40 to the circuit board of the network device.

This allows the electrical supply current, sufficient to power an access point (a network device), to be transmitted concurrently with a network data signal across a transmission line wherein a single unit is provided for the network device transformer functions. A power and data coupler may also be used that couples the network data signal and the power signal, received through a data input and a power input respectively, and transmits the coupled signal, to a distance of three meters or more, over the transmission line to a power and data decoupler. The power and data decoupler separates the power signal from the network data signal and supplies those signals to a power output port and a data output port, respectively, for use by a wireless access node. The power signal may be modulated at a low frequency relative to the frequency of the data signal, and the network data signal has a data transmission rate of one megabit/second or higher.

While a specific embodiment of the invention has been shown and described in detail to illustrate the application of the principles of the invention, it will be understood that the invention may be embodied otherwise without departing from such principles.

What is claimed is:

1. A transformer unit, comprising:

an isolation transformer having a first winding and a second winding;

a power transformer having a first winding connected to said first winding of said isolation transformer and having a second winding;

a single package incorporating said isolation transformer and said power transformer; and a plurality of connection pins including pins providing connections to said isolation transformer from outside said package and pins providing connections to said power transformer from outside said package, said plurality of connection pins including transmission line connection pins, connecting between said isolation transformer and transmission lines carrying a signal with concurrently a power component and a communications network data signal component, isolated communications network data pins connected between a network device and said isolation transformer second winding and an isolated communications network: data signal and transformed power signal pins connected between said power transformer second winding and a power contact of the network device said carrying a transformed power signal.

2. A transformer unit according to claim 1, wherein said transmission lines are Ethernet network data $Tx^+$, $Tx^-$, $Rx^+$, $Rx^-$ lines.

3. A transformer unit according to claim 1 wherein said transmission lines carry a 60 Hz 48 V AC signal (60 Hz ISO 48V potential ) between the $Tx^+$ and $Tx^-$ and the $Rx^+$ and $Rx^-$ and the $Tx^+$ and $Tx^-$ have a series superimposed plus 2V pulse signal as said data signal.

4. A transformer unit according to claim 1, where said transformed power signal pins provide 12 volts AC to a circuit board connected to a power contact; of the network device.

5. A transformer unit according to claim 1, wherein said power transformer includes a core and a winding and two isolation transformers are provided each including a core and windings.

6. A transformer unit according to claim 1, further comprising another isolation transformer, wherein said isolation transformer and said another isolation transformer each include a center tap.

7. A transformer unit, comprising:

a first isolation transformer having a first winding and a second winding;

a second isolation transformer having a first winding and a second winding;

a power transformer having a first winding connected to said first isolation transformer first winding and connected to said second isolation transformer first winding and said power transformer having a second winding;

a single package incorporating said first isolation transformer, said second isolation transformer and said power transformer;

first and second transmission path wire connection pins each connected to said first isolation transformer first winding and each extending out of said package and each respectively connected to a transmission line carrying one of an ETHERNET $Tx^+$ or ETHERNET $Tx^-$ network signal and concurrently a power component;

first and second isolated transmission path pins each connected to said first isolation transformer second winding and each extending out of said package and each being respectively connected to contacts of a circuit board of the network device and carrying one of an ETHERNET $Tx^+$ or ETHERNET $Tx^-$ isolated signal, isolated from the network signal, and concurrently the isolated power component;

first and second receiving path wire connection pins each connected to said second isolation transformer first winding and each extending out of said package and each respectively connected to a transmission line carrying one of an ETHERNET $Rx^+$ or ETHERNET $Rx^-$ network signal and concurrently a power component;

first and second isolated receiving path pins each connected to said second isolation transformer second winding and each extending out of said package and each being respectively connected to contacts of a circuit board of the network device and carrying one of the ETHERNET $Rx^+$ or ETHERNET $Rx^-$ isolated signal, isolated from the network signal, and concurrently the isolated power component; and first and second transformed power signal pins connected to said power transformer first winding and said power transformer second winding and carrying a transformed power signal.

8. A transformer unit according to claim 7, wherein said transmission lines carry a 60 Hz 48 V AC signal (60 Hz ISO 48V poential) between the $Tx^+$ and $Tx^-$ and the $Rx^+$ and $Rx^-$ and the $Tx^+$ and $Tx^-$ have a series superimposed plus 2V pulse signal as said data signal.

9. A transformer unit according to claim 7, wherein said power transformer includes a core and a winding and said first isolation transformer and said second isolation transformer are provided each including a core and windings.

10. A transformer unit according to claim 7, wherein sad first isolation transformer and said second isolation transformer each including a center tap.

11. A process for connecting transmission lines to a network device, the process comprising the steps of:

providing transmission lines carrying an electrical supply AC signal with a series superimposed pulse signal as a data signal;

providing a single package with a first integrated isolation transformer with first and second windings disposed in said package with said first winding connected to pins extending out of said package and with said second winding connected to pins extending out of said package, a second integrated isolation transformer with first and second windings disposed in said package and with said second isolation transformer first winding connected to pins extending out of said package and with said second isolation transformer second winding connected to pins extending out of said package and with a power transformer with first and second windings disposed in said package with said power transformer second windings connected to pins extending out of said package;

connecting the network device to the first integrated isolation transformer second winding pins and to the second integrated isolation transformer second winding pins outside of the package;

connecting some of the transmission lines to the first isolation transformer first winding pins to connect the first isolation transformer first winding to transmission signals on the sending transmission lines;

connecting some other transmission lines to the second isolation transformer first windings pins to connect the second isolation transformer first winding to transmission signals on the receiving transmission lines;

within the single package, connecting each of the first isolation transformer first winding and the second isolation transformer first winding to the power transformer first winding;

connecting the power transformer second winding pins to a power contact of the network device to use the power transformer to supply power to the circuit board of the network device at a potential which is reduced compared to a potential of said transmission lines carrying the electrical supply current.

12. A transformer unit, comprising:

a first isolation transformer;

a second isolation transformer;

a power transformer;

a single package incorporating said first isolation transformer, said second isolation transformer and said power transformed; and a plurality of connection pins extending form outside of the single package to within the single package and including first isolation transformer isolation pins, first isolation transformer network pins, second isolation transformer isolation pins, second isolation transformer network pins and power transformer stepped down voltage pins, wherein said first isolation transformer and said second isolation transformer each include an isolation center tap pin.

13. A transformer unit according to claim 12, wherein said power transformer is connected to said first isolation transformer center tap and to said second isolation transformer center tap.

14. A transformer unit according to claim 12, wherein said transmission lines are carrier sense multiple access/collision detection network data $Tx^+$, $Tx^-$, $Rx^+$, $Rx^-$ lines.

* * * * *